Oct. 13, 1959 R. K. LOCKHART 2,908,752

COLOR SIGNAL DEMODULATING AND MATRIXING

Filed March 7, 1956 2 Sheets-Sheet 1

INVENTOR.
Robert K. Lockhart
BY
[signature]
ATTORNEY

INVENTOR.
Robert K. Lockhart
BY
[signature]
ATTORNEY

United States Patent Office 2,908,752

Patented Oct. 13, 1959

2,908,752

COLOR SIGNAL DEMODULATING AND MATRIXING

Robert K. Lockhart, Moorestown, N.J., assignor to Radio Corporation of America, a corporation of Delaware Application March 7, 1956, Serial No. 570,038

3 Claims. (Cl. 178—5.4)

The present invention relates to circuits for producing a reproduced color image having improved definition.

The color television signal conforming to standards adopted by the Federal Communications Commission on December 17, 1953, includes a luminance signal and a chrominance signal. The luminance signal is a wideband brightness information signal having frequency components up to 4.2 mcs.

The chrominance signal is a modulated subcarrier including information representative of a wide gamut of color difference signals. In a color television system employing, for example, red, blue and green component color images, color difference signals of the type R—Y, B—Y and G—Y describe, respectively, how the red, blue and green component colors in the televised image differ from the brightness of that image.

The chrominance signal contains R—Y, B—Y and G—Y color difference signal information. However, as transmitted, these color difference signals are narrow band, having a band-width of from 0 to approximately ½ mc. Modulations representing a color difference signal termed an I signal, describing orange-cyan axis information, is also included in the chrominance signal. The I signal includes color difference signal components from approximately 0 to 1½ mc. The addition of proper magnitudes and polarities of I signal information to the R—Y, B—Y and G—Y derived directly from the chrominance signal, may be used to increase the bandwidth of these color difference signals to 1½ mc.

In color television receivers of the type to be described, the component color signals, each of which is a combination of the luminance signal and a narrowband color difference signal, is derived directly from the color television signal by use of a color converter. The color converter, unlike a synchronous demodulator which demodulates a color difference signal from the chrominance signal, accepts the complete color television signal and develops a component color signal therefrom. However, it is desirable that means be provided for increasing the so-called color bandwidth of each of the component color signals derived from a color converter so as to take advantage of the higher definition provided by the use of the higher frequency I signal components, particularly those signal frequencies in the range from ½ to 1½ mcs.

It is therefore an object of this invention to provide an improved means for improving the color edge definition of a reproduced image in color television receivers using color converters.

It is a still further object of this invention to provide an improved means for applying color information to a color image reproducer in a color television receiver.

According to the invention, demodulated orange-cyan axis information having a frequency range from ½ to 1½ mcs. is combined with the output signal of a color converter circuit, the output signal constituting a component color signal including a luminance signal and a narrow band color difference signal.

In one form of the invention, the component color signal which includes the narrow bandwidth color difference signal is applied to one control electrode of one selected electron gun of a color kinescope. Higher frequency components of orange-cyan color axis information having proper magnitudes and polarities are applied to a second control electrode of the selected electron gun; the electron beam issuing from that gun will thereupon include modulations representative of a component color signal having increased color bandwidth.

Other and incidental objects of this invention will become apparent after a reading of the following specification and a study of the drawings, wherein.

Figure 1:
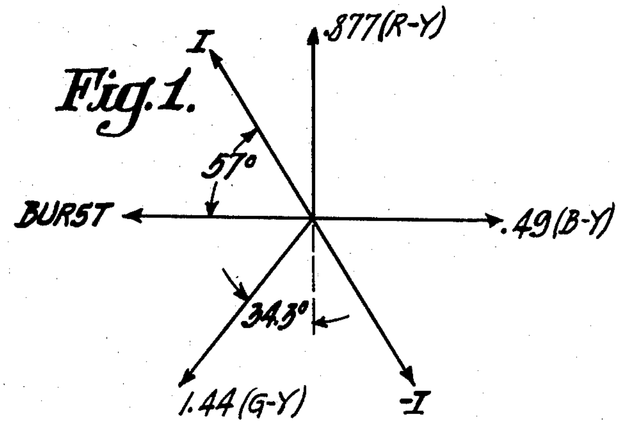
Figure 1 is a vector diagram relating the phases and amplitudes of various color difference signals in the chrominance signal.

Figure 1 is a vector diagram relating the phases and amplitudes of the R—Y, B—Y and G—Y color difference signals contained as color information in the chrominance or chroma signal. It is seen from the vector diagram of Figure 1 that the R—Y and B—Y color difference signals are in phase quadrature with the phase of the G—Y color difference signal lagging the phase of the B—Y color difference signal by 123°. It is further noted from the vector diagram of Figure 1 that R—Y, B—Y and G—Y color difference signal information is contained in the chrominance signal according to amplitude level having the respective proportions .877:49:1.44.

In order that the accurately phased demodulating signals for synchronous detection may be generated in a color television receiver, 3.58 mcs. signal bursts of reference phase information are transmitted on the "back porch" of each horizontal synchronizing pulse. These bursts, as is seen from the vector diagram of Figure 1, have a phase which leads the phase of the R—Y color difference signal by 90°.

As has been described previously in this specification, the color difference signals R—Y, B—Y and G—Y shown in Figure 1 have a band of frequencies from approximately 0 to ½ mc. When employing a subcarrier frequency of 3.58 mcs., the frequency band of the chroma signal is in the vicinity of from 3.0 to 4.2 mcs.

The chrominance signal also includes the I signal. The phase of the I signal lags the burst phase by 57°. I signal information has a frequency range from 0 to 1½ mc.; therefore, with a subcarrier of 3.58 mcs., the chrominance signal has a frequency band from approximately 2 to 4.2 mcs. Since the upper sideband is limited to less than 4.2 mcs., the I signal information above .5 mc. is included in the chroma signal in single sideband. This is due to the fact that the upper limit of the frequency band of the composite color television signal is 4.2 mcs. with the sound information transmitted at 4.5 mcs.

Figure 2:
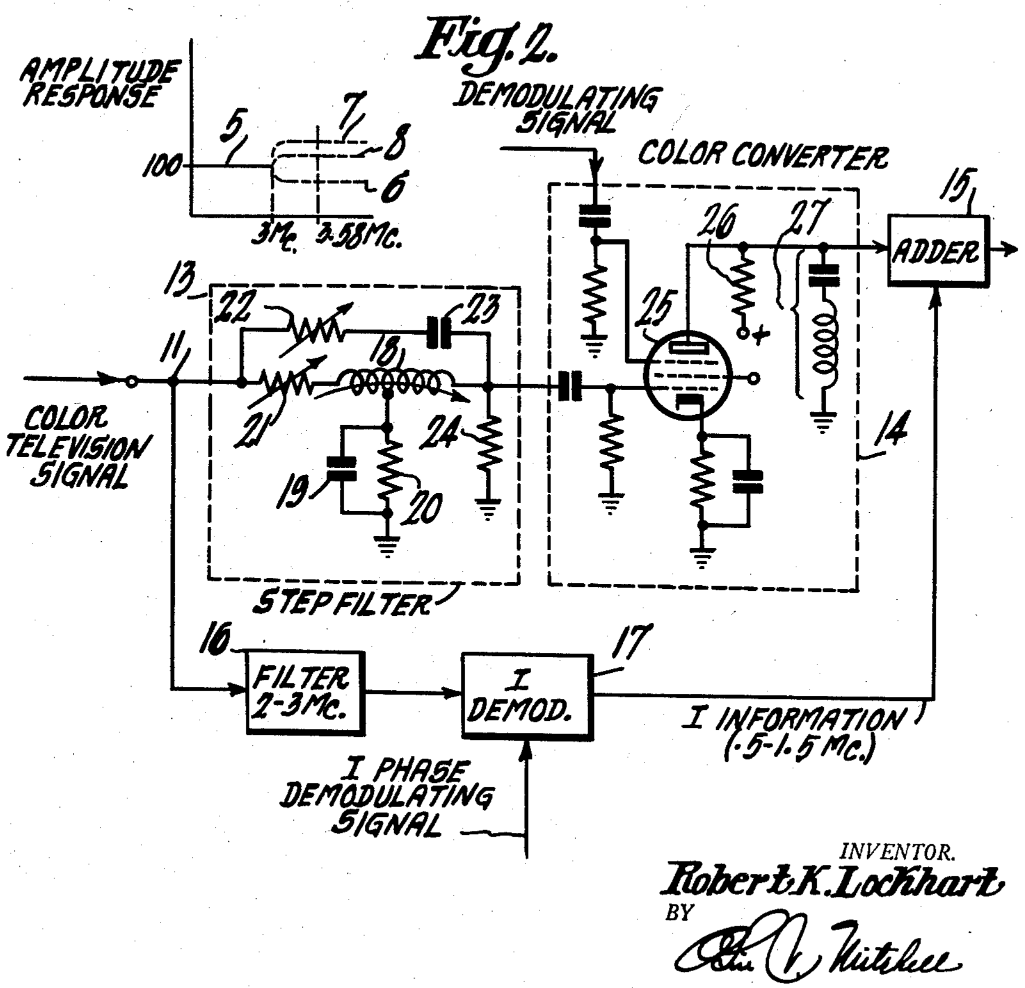
Figure 2 is a block diagram of one form of the present invention.

Figure 2 is a diagram of a typical circuit of the present invention. A color television signal which includes the luminance signal and the chrominance signal is applied to an input terminal 11. The color television signal is thereupon passed through the step filter 13 which accentuates or deaccentuates the amplitude of the components in the vicinity of the chrominance signal in the color television signal depending upon the nature of the color information to be developed. If a green component color signal is to be developed by the color converter 14, then, since according to the diagram of Figure 1, the G—Y color difference signal has a relative amplitude level of 1.44, the amplitude response of the step filter 13 will be of the type illustrated by the curve 5 and the step to the curve 6 providing amplitude response at a reduced amplitude in the frequency region above 3 mcs. In order to properly compensate for the high level of green color information in the chrominance signal, the step filter 13 reduces the amplitude level above 3 mcs. according to the proportion 100/1.44 or to 69%. If the color converter 14 is to produce a component red or blue signal, then the step filter 13 should preferably be designed to have respectively, the steps to the amplitude response curves 7 or 8 to accentuate the frequency range above 3 mcs. of the color television signal according to the ratio 100/87 for the component red signal or 100/49 for the component blue signal.

The amplitude compensated signal from the step filter 13 is applied to the color converter 14. Responsive to both a demodulating signal of selected phase and to the amplitude compensated color television signal, the output of the color converter is a component color signal which, due to the amplitude compensation provided by the step filter 13, correctly provides the color saturation representative of that color in the televised image.

The output of the color converter will be substantially the luminance signal combined with the color difference signal corresponding to the phase of the demodulating signal. The color difference signal information provided at the output of the color converter 14 will have a frequency range of typically from 0 to ½ mc. The output of the color converter 14 is thereupon applied to the adder 15.

In order to increase the frequency range of the color difference signal information in the component color signal provided by the color converter 14, means are additionally provided for demodulating I signal information in the frequency range from ½ to 1½ mcs.; this high frequency I signal information is thereupon applied to the adder 15; the output signal of the adder is thereupon a component color signal including color information up to 1½ mc. The aforementioned means of providing the higher frequency I information is accomplished by use of the filter 16 which selects the frequency range from 2 to 3 mcs. from the color television signal and applies these selected components to the I demodulator 17 to which is also applied an I phased demodulating signal. The output of the I demodulator 17 is the aforementioned I signal component having a frequency range from ½ to 1½ mcs.

Each component color will require a prescribed amplitude and a polarity of the higher frequency I signal information. The red component color signal will require I signal information of positive polarity. The B—Y and G—Y component color signals will each require I signal information of a negative polarity.

The step filter 13 and the color converter 14 of Figure 2 use circuits which illustrate typical, though not necessarily preferred, circuits.

The step filter 13 is a bridged-T circuit. One element of the bridged-T circuit is an inductively-coupled series arm inductance 18. A shunt arm comprising the condenser 19 and the resistor 20 is connected between series inductance 18 and ground. An adjustable resistance 21 is connected in series with the series arm inductance 18. A bridge circuit comprising the adjustable resistance 22 and a condenser 23, is connected to bridge the serially connected adjustable resistance 21 and the series arm inductance 18. A resistance 24 terminates one end of the structure. The resistance 20 in the shunt arm provides a termination of the portion of the step filter made up by the series arm inductance 18 and the shunt arm condenser 19. By proper choice of the circuit parameters of the step filter 13 and by adjustment of the resistors 21 and 22, a step will be introduced into the amplitude versus frequency response curve of the step filter 13 to provide proper accentuation or deaccentuation of frequency components above a selected frequency such as 3 mcs. as required.

The color converter 14 includes, typically, the pentode 25. The amplitude compensated color television signal is coupled to the first control grid of the pentode 25; the demodulating signal is coupled to the third grid of this tube. A load resistance 26 is connected to the anode of the pentode 25; both the luminance signal and the demodulated signal are developed across this resistance. A filter 27 which is series resonant at the frequency of the demodulating signal coupled from the anode of pentode 45 to ground is used to eliminate signal components having the frequency of the demodulating signal from signals developed across the load resistance 26. Signals developed across the load resistance 26 are thereupon applied to the adder 15 as previously described.

Figure 3:
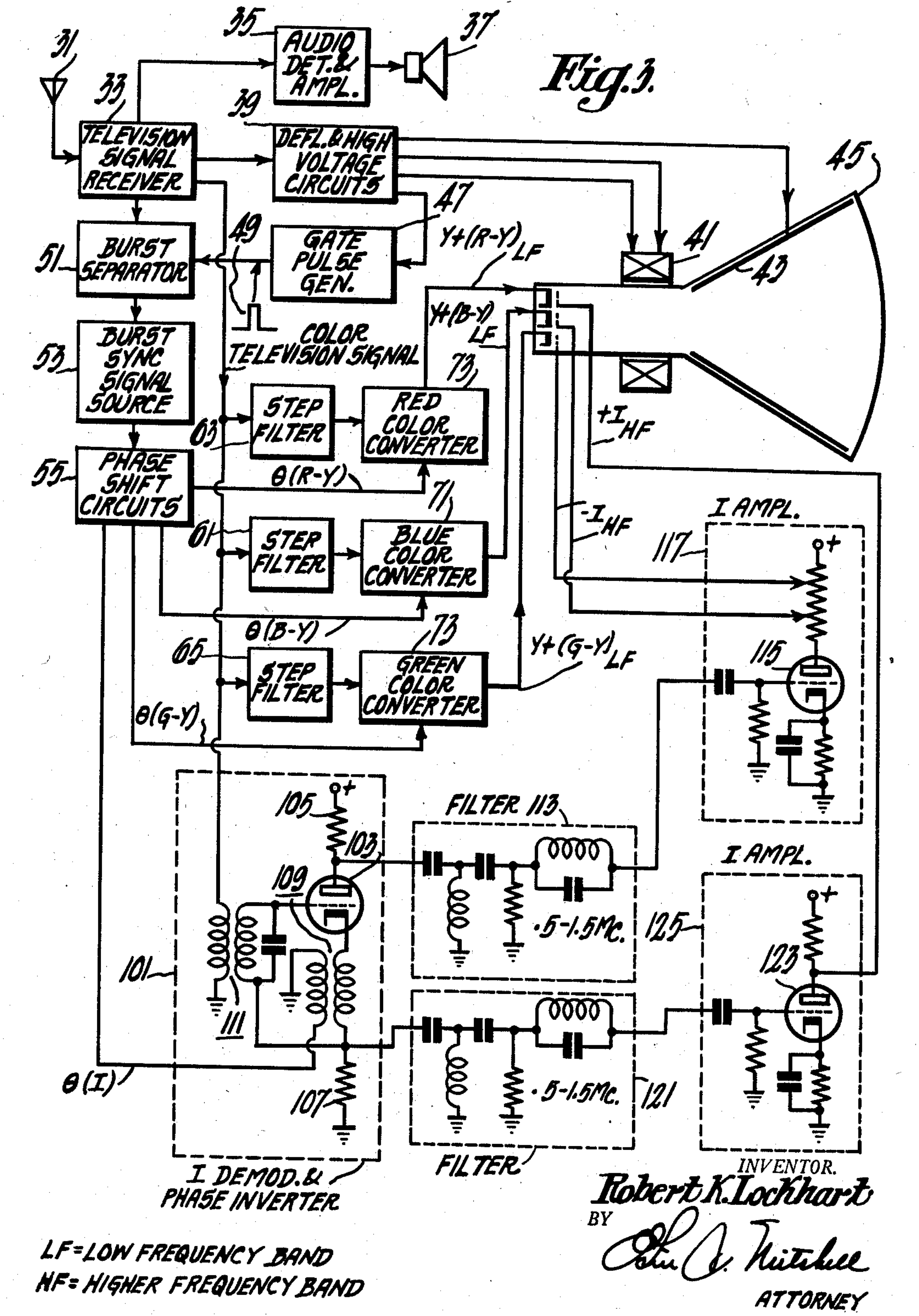
Figure 3 is a diagram of a color television receiver which employs the present invention in one of its forms.

Figure 3 is a diagram of a color television receiver circuit which uses one form of the present invention.

The incoming signal from the broadcast transmitter is received at the antenna 31 and applied to the television signal receiver 33. The television signal receiver demodulates the composite color television signal from the incoming signal using, for example, a superheterodyne circuit. The composite color television signal includes the previously mentioned luminance signal, chrominance signal and color synchronizing bursts and also deflection synchronizing signals and a frequency modulated sound carrier which is transmitted 4½ mcs. removed from the picture carrier.

Using, for example, an intercarrier sound circuit, the audio information is detected from the composite color television signal and amplified in the audio detector and amplifier 35. The amplified audio signal is applied to the loud speaker 37.

The deflection synchronizing signals are separated from the composite signal in the deflection and high voltage circuits 39 wherein both vertical and horizontal deflection signals are generated in addition to a high voltage. The vertical and horizontal deflection signals are applied to the deflection yokes 41; the high voltage is applied to the ultor 43 of the color kinescope 45.

The deflection and high voltage circuits also energize the gate pulse generator 47 so that during the horizontal retrace interval and more specifically during the duration interval normally occupied by the color synchronizing bursts, a gate pulse 49 is generated. The gate pulse 49 and the composite color television signal are applied to the burst separator 51; the burst separator 51 is a gate type of circuit, which, responsive to the gate pulse 49, separates the color synchronizing bursts from the composite color television signal.

The separated bursts are thereupon applied to the burst synchronized signal source 53 which develops a reference signal which is continuous during at least each scanning line. Using, for example, an injection-lock type of oscillator, or a ringing circuit, or an oscillator working in conjunction with a reactance-tube-automatic-frequency-control type of circuit, the reference signal is accurately phased to a phase prescribed by the bursts. The reference signal is thereupon applied to the phase shift circuit 55 which generates typically a plurality of demodulating signals having selected phases which are accurately maintained. In the color television receiver of Figure 3, the phase shift circuit 55 develops demodulating signals corresponding to the phases of the R—Y, B—Y and G—Y color difference signals whose phases are described by the vectors of Figure 1. The phases of the R—Y, B—Y and G—Y color difference signals are denoted on the drawing of Figure 3 as $\theta$ (R—Y), $\theta$ (B—Y) and $\theta$ (G—Y), respectively.

The composite color television signal is passed through the polarity inverter 57 which inverts the polarity of at least the luminance signal information. It is to be appreciated that whereas the chrominance signal is therefore also reversed in polarity, the expedient of properly phasing the demodulating signals in accordance with this polarity reversal, permits the extraction of the correct color difference signal information from the chrominance signal by, for example, a color converter. The output of the polarity inverter 57 is therefore termed a $-Y+$chroma. The $-Y+$chroma signal is thereupon applied simultaneously to the step filters 61, 63 and 65.

The step filter 61 increases the amplitude of the chrominance signal frequency band in the frequency range above 3 mcs., according to the ratio of 100/49 or to 203% of the relative amplitude level of the lower frequency components of composite signals below 3 mcs.

The step filter 61 applies an amplitude-adjusted composite color television signal to the blue color converter 71. The phase shift circuit 55 also applies an R—Y phased demodulating signal to the blue color converter 71. The blue color converter, responsive to the applied signals, thereupon develops a blue component color information signal which is applied to a control electrode of the electron gun which controls the light emission of the blue phosphors of the color kinescope 45. The output component color signal from the blue color converter 71 is therefore correctly indicative of the saturation of the blue color in the televised image.

The step filter 63 increases the relative level of the R—Y color difference signal in the chrominance signal according to the quotient 100/.887. The output of the step filter 63 is applied to the red color converter. Responsive to the output signal of the step filter 63 and to the R—Y phase demodulating signal, the red color converter develops a red component color signal which is applied to the red phosphor controlling gun of the color kinescope 45 to provide a red component color of correct saturation in the televised image.

The step filter 65 applies an amplitude compensated composite color television signal to the green color converter 75. In the step filter 65 the amplitude of the chrominance signal in the range from 3 to 4.2 mcs. in the composite color television signal is reduced according to the ratio of 100/1.44 or 69%. The green color converter 75, responsive to the output signal of the step filter 65 and to the G—Y phased demodulating signal, develops a green component color signal which is thereupon applied to a corresponding control electrode of the color kinescope 45; this green component color signal properly describes the color saturation of the green information in the televised image.

The color television receiver of Figure 3 includes the I demodulator and phase inverter 101. The I demodulator and phase inverter 101 utilizes a triode 103; the triode 103 has a plate resistance 105 and a cathode resistance 107. The cathode resistance is coupled to the cathode of triode 103 by way of the secondary winding of the transformer 109. An I phased demodulating signal from the phase shift circuits 55 is applied to the primary winding of the transformer 109.

The color television signal is applied to the filter circuit 111 which includes a tuned circuit 113. The tuned circuit 113 develops signals in the frequency range from 2 to 3 mcs. between the control grid of triode 103 and the off-ground terminal of the cathode resistance 107. The triode 103 thereupon develops an I signal of positive polarity across the anode resistor 105 and an I signal of negative polarity across the cathode resistor 107.

The demodulated I signal of positive polarity produced across the anode resistor 105 is applied to the filter 113 which filters out all components but those in the passband from ½ to 1½ mcs. The filtered I signal from the filter 113 is thereupon applied to the control grid of the triode 115 of the I amplifier 117. The triode 115 develops an I signal of negative polarity having a frequency range from ½ to 1½ mcs. across the plate resistor 119. Selected magnitudes of this I signal of negative polarity are thereupon applied to the control grids of the electron guns of the color kinescope 45, to which are also applied the component color signals from the blue and green color converters 71 and 75, respectively.

The I signal of negative polarity from the cathode resistor 107 is passed through the filter 121 which selects only those frequency components in the range from ½ to 1½ mcs. The output of the filter 121 is used to drive the control grid of the triode 123 of the I amplifier 125. The I amplifier 125 inverts the polarity of the applied I signal and thereupon applies an I signal of positive polarity and of proper amplitude, constituting I signal components between ½ and 1½ mcs., to the control grid of the electron gun of the color kinescope 45, to which is also applied the component red color signal by the red color converter 73.

The specific embodiment of the invention illustrated by Figure 3 shows the component color signals including narrowband color information applied to the cathodes of the electron guns with the higher frequency color components applied to the control grids of these guns. It is to be appreciated that the component color signal including narrowband component color information may also be developed between the cathodes and control grids of these guns, with the higher frequency I signal information of selected polarities and magnitude thereupon applied to the screen grids of the electron guns.

Having described the invention, what is claimed is:

1. In a color television receiver adapted to receive a composite color television signal including a luminance signal, color synchronizing bursts and a chrominance signal, said chrominance signal including modulations representative of a wide gamut of color difference signal information in a first and lower frequency range and orange-cyan information in a second and higher frequency range which does not overlap said first frequency range, the combination of: a filter means having step function characteristics to alter the amplitude level of a selected range of frequencies in said composite color television signal; a color converter means; means responsive to said color synchronizing bursts to develop at least a first demodulating signal phased according to said orange-cyan information and a second demodulating signal phased according to a selected color difference signal; means to apply said amplitude altered composite color television signal and said second demodulating signal to said color converter to develop a component color signal representative of said luminance signal combined with said selected color difference signal having said first frequency range; a filter circuit to select components representative of said second frequency range of said chrominance signal from said composite color television signal; a demodulator circuit responsive to the output of said filter circuit and to said first demodulating signal to produce a color information signal representative of said orange-cyan color difference signal information in said second frequency range; and signal combining means to combine said first component color signal and said color information signal developed by said demodulator circuit to form a component color signal including color difference signal information in both said first and second frequency ranges to form a second component color information signal.

2. In a color television receiver adapted to receive a composite color television signal including a luminance signal, color synchronizing bursts and a chrominance signal, said chrominance signal including modulations representative of a wide gamut of color difference signal information in a first and lower frequency range and orange-cyan information in a second and higher frequency range, the combination of: filter means having a step function characteristic to alter the amplitude level of the frequency range of said composite color television signal corresponding to said first frequency range of color information according to a prescribed level relative to the amplitude level of the frequency components of said composite color television signal in a lower frequency range of that signal; means responsive to said color synchronizing bursts to develop a first demodulating signal having a phase corresponding to a selected color difference signal in said chrominance signal and a second phase corresponding to said orange-cyan color difference signal information in said chrominance signal; an electron tube having a plurality of control electrodes and an output circuit; means to apply said first demodulating signal and said amplitude altered composite color television signal to respective ones of said plurality of control electrodes to develop a first component color signal in said output circuit, said first component color signal comprising said luminance signal combined with said selected color television signal having said first frequency range; means to filter a band of frequencies corresponding to said second frequency range from said composite color television signal; a demodulator device; means to apply said filtered components and said second demodulating signal to said demodulator device to develop a color information signal corresponding to said orange-cyan axis information in at least said second frequency range; a color image reproducer having an electron gun including a cathode and a control grid; means to apply said component color signal to said cathode; and means to apply a selected polarity and amplitude of said color information signal to said control grid.

3. In a color television receiver adapted to receive a composite color television signal including a luminance signal, color synchronizing bursts and a chrominance signal, said chrominance signal including modulations representative of a wide gamut of color difference signal information in a first and lower frequency range and orange-cyan information in a second and higher frequency range, the combination of: a plurality of filter means having different step function characteristics to alter the amplitude level of the frequency range of said composite color television signal corresponding to said first frequency range of color information according to prescribed levels relative to the amplitude level of the frequency components of said composite color television signal in a lower frequency range of that signal; means responsive to said color synchronizing bursts to develop a plurality of demodulating signals having different phases corresponding to a selected color difference signal in said chrominance signal and an I signal phase corresponding to said orange-cyan color difference signal information in said chrominance signal; a plurality of electron devices each having a plurality of control electrodes and an output circuit; means to apply one of each of said plurality of demodulating signals and said amplitude altered composite color television signals to one of said plurality of electron devices to develop a corresponding component color signal in each of said output circuits; each of said component color signal comprising said luminance signal combined with said corresponding color television signal having said first frequency range; means to filter a band of frequencies corresponding to higher frequency range not overlapping said first frequency range from said composite color television signal; a demodulator device; means to apply said filtered components and said second demodulating signal to said demodulator device to develop a color information signal corresponding to said orange-cyan axis information in at least said higher frequency range; and means to combine a prescribed magnitude and polarity of said color information signal with each of said corresponding component color signals.

References Cited in the file of this patent

UNITED STATES PATENTS 2,732,425 Pritchard -------------- Jan. 24, 1956

OTHER REFERENCES

Admiral Experimental Chassis 38A1, from Admiral "Introduction to Color Television," February 1954.